Figure 5:
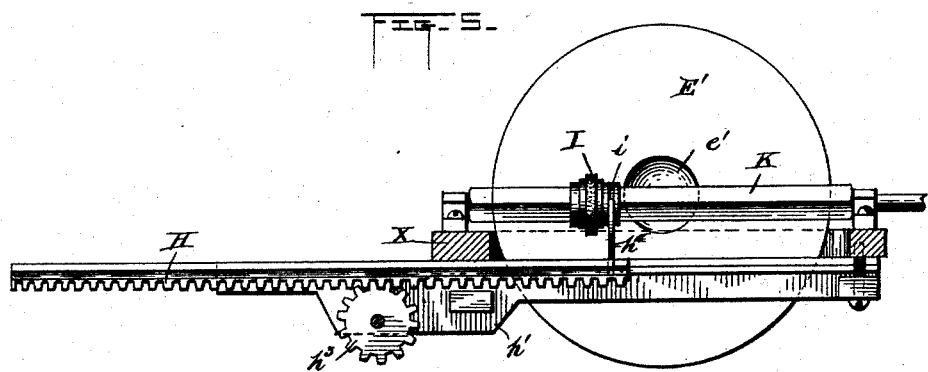
Figure 5:
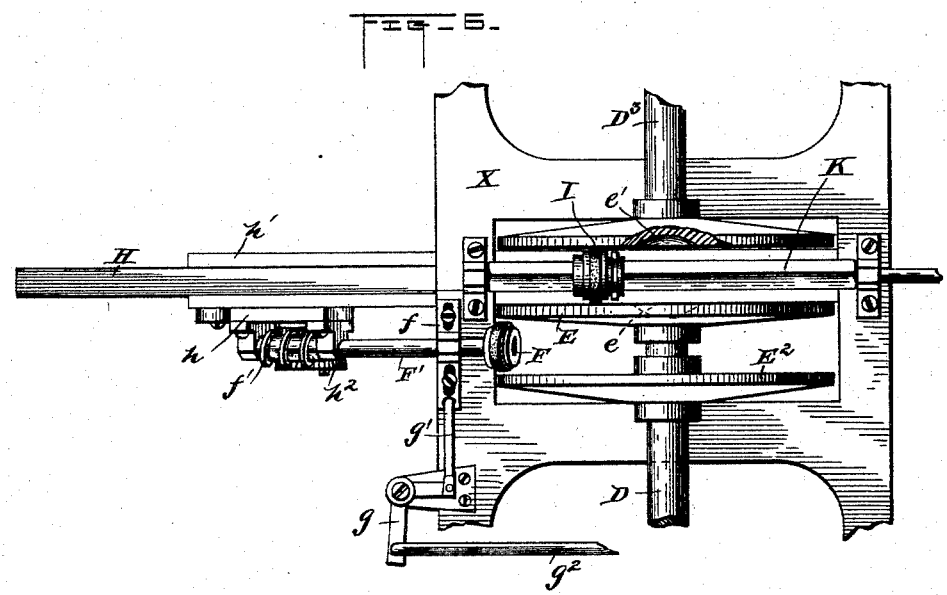

(No Model.) 4 Sheets—Sheet 1.
F. B. WILLIAMS.
SAW MILL FEED.
No. 456,456. Patented July 21, 1891.
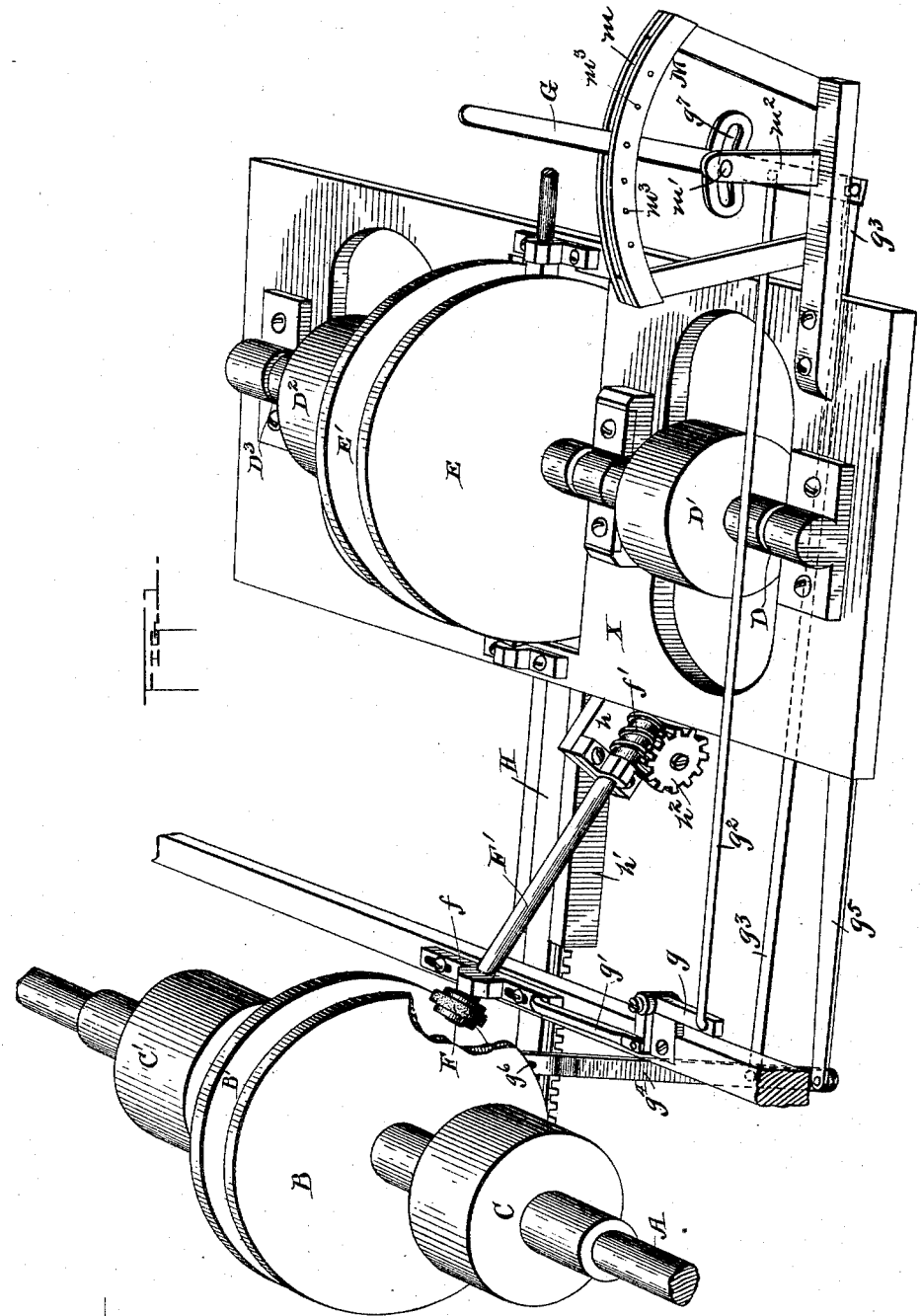
Witnesses:
G. Severance.
H. W. Perry.
Inventor:
Frank B. Williams.
By L. Deane
his Attorney.

(No Model.)  4 Sheets—Sheet 2.
F. B. WILLIAMS.
SAW MILL FEED.
No. 456,456.  Patented July 21, 1891.
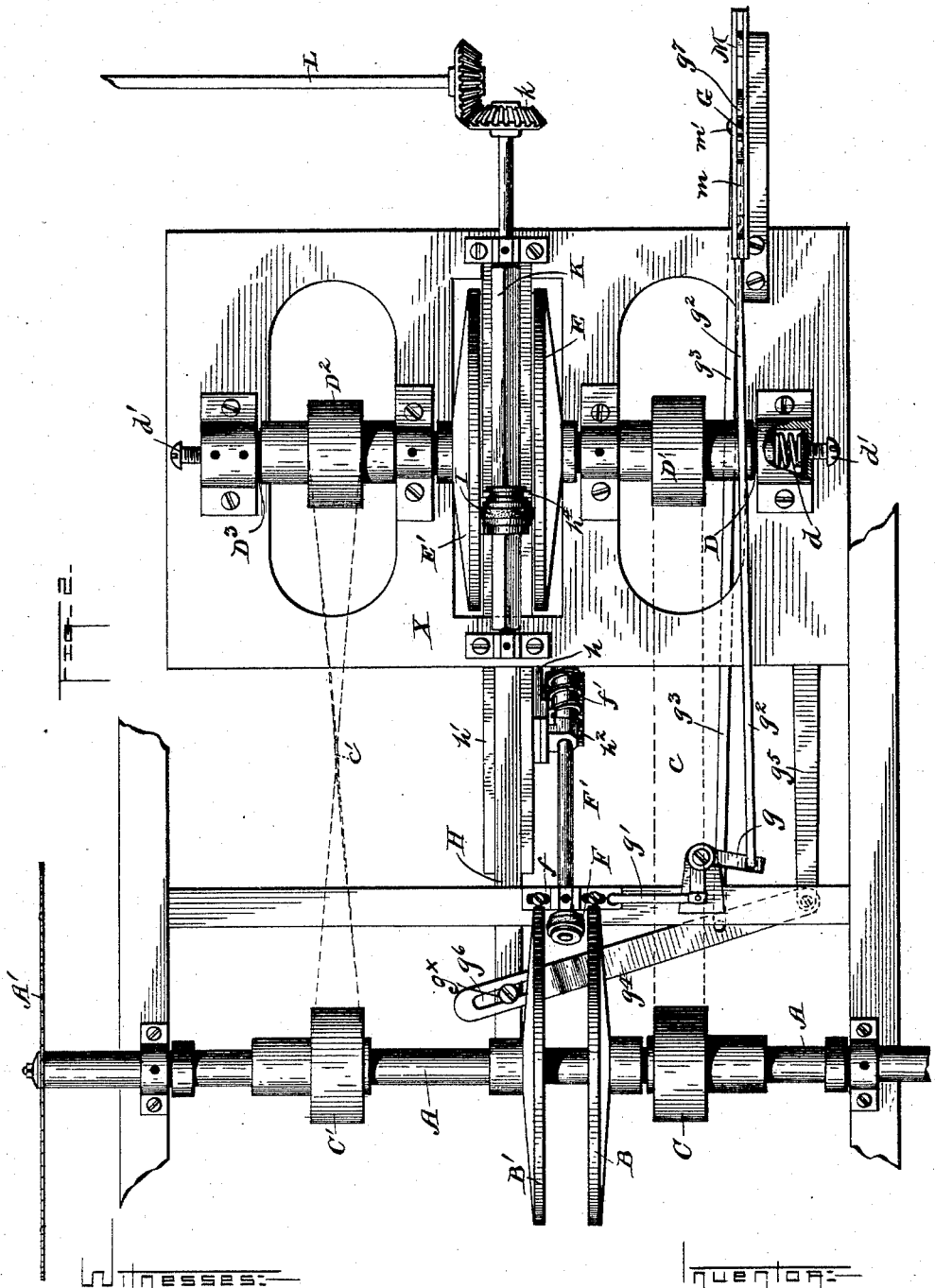
Witnesses:
Severance
H. W. Perry
Inventor:
Frank B. Williams,
By L. Deane
his Attorney.

(No Model.) 4 Sheets—Sheet 3.
F. B. WILLIAMS.
SAW MILL FEED.
No. 456,456. Patented July 21, 1891.
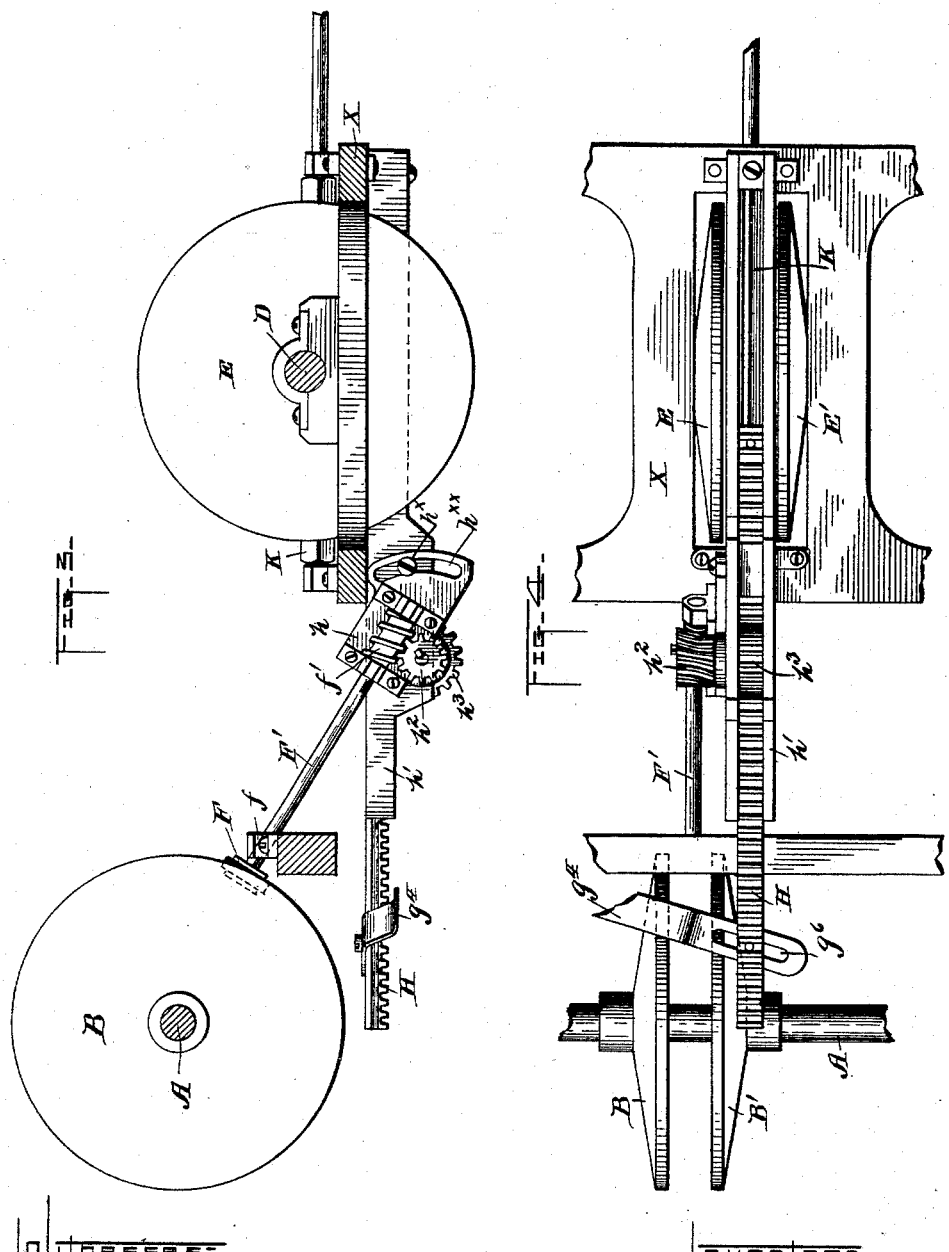
Witnesses:
Severance
H. W. Perry
Inventor:
Frank B. Williams,
By L. Deane
his Attorney.

(No Model.)  
4 Sheets—Sheet 4.

F. B. WILLIAMS.
SAW MILL FEED.

No. 456,456. Patented July 21, 1891.

Witnesses:  
Severance  
H. W. Perry

Inventor:  
Frank B. Williams,  
By ____  
his Attorney.

UNITED STATES PATENT OFFICE.

FRANK. B. WILLIAMS, OF BURLINGTON, IOWA.

SAW-MILL FEED.

SPECIFICATION forming part of Letters Patent No. 456,456, dated July 21, 1891.

Application filed November 22, 1890. Serial No. 372,352. (No model.)

*To all whom it may concern:*

Be it known that I, FRANK. B. WILLIAMS, a citizen of the United States, residing at Burlington, in the county of Des Moines and State of Iowa, have invented certain new and useful Improvements in Saw-Mill Feeds; and I do hereby declare the following to be a full, clear, and exact description of the invention, such as will enable others skilled in the art to which it appertains to make and use the same.

The invention relates to improvements in saw-mill feed mechanism, its object being to provide a simple, durable, and efficient machine by which the feeding of the logs to or from the saw or gang of saws can be at all times regulated and controlled; and it consists in the construction, arrangement, and novel combination of parts, hereinafter described, illustrated in the drawings, and pointed out in the claims hereto appended.

In the accompanying drawings, in which similar letters of reference indicate similar parts, Figure 1 represents a perspective view of the invention. Fig. 2 is a top plan view of the device shown in Fig. 1. Fig. 3 is a detail in side elevation showing the mechanism by which the motion of the feed is changed. Fig. 4 is a detail in bottom plan showing the rack, worm-gear, &c., by which the feed motion is changed; Fig. 5, detail showing connection between the rack-bar and the shaft that operates to moves the feed; Fig. 6, modification of the application of the disks.

Referring to the drawings by letter, A designates the saw-shaft mounted in suitable bearings in the frame of the machine. This frame is not shown, not being necessary for the understanding of the invention. The saw-shaft is driven by any suitable power and has at one end the saw A'. Toward the middle of the shaft and at a little distance from each other are fixed the similar disks B B'. Outside of these, at any proper position on this shaft, are respectively placed the belt-pulleys C C'. The belt $c$ from the pulley C is passed straight over the pulley D' on the short shaft D, mounted in suitable bearings on a bed X, secured to the main frame, so that said shaft shall be parallel and opposite, but not necessarily on the same plane with the saw-shaft. The belt $c'$ on the pulley C' passes over the pulley $D^2$ on the short shaft $D^3$, which is mounted on the frame, like the shaft D, and is in alignment with the said shaft. This belt $c'$ is twisted. Thus the shaft D is driven in the same direction with the saw-shaft; but the shaft $D^3$ has an opposite or reverse motion. Respectively on the inner ends of the shafts D and $D^3$ are the similar disks E E', situate at a little distance apart.

When the device is in operation, the disks B and B' on the saw-shaft and E on the shorter shaft D have the same motion, while the disk E' revolves in the opposite direction.

To impart the forward or backward motion to the feed-carriage, (not shown,) the friction-wheel F on the end of the inclined shaft F' is placed between the disks B and B'. This shaft, at its upper end passing through the sliding guide $f$, placed on the frame of the machine, can be so moved horizontally by means of the bell-crank lever $g$ and suitable rods $g'$ $g^2$ and lever G, pivoted in a frame M near the front of the device, that the friction-wheel F on its upper end can be made to impinge on either disk B or B', as desired, or may be placed centrally between them, so as to impinge on neither. The lower end of this shaft is held in suitable bearings in the bracket $h$, which is pivoted, as at $h^\times$, to the guide-frame $h'$ of the rack-bar H, the pivot $h^\times$ passing through an arcuate slot $h^{\times\times}$ in said bracket to permit of the annular adjustment of the shaft F' with relation to the saw-shaft A. The worm-gear $f'$ on this lower end of the shaft F' meshes with the worm-wheel $h^2$, keyed to the shaft passing through the rack-frame. The movement of this wheel $h^2$ imparts motion to the pinion $h^3$ on the same shaft, and this pinion can be operated to move this rack back or forth, the direction of the movement being determined by the direction of the movement of the friction-pulley F upon the disk B or B', as above described. At the end of the rack H, which, with its guide-frame, passes between the disks E and E' at their lower edges, there is fixed a fork or clutch $h^4$, which engages in the groove in the projection $i$ on the friction-pulley I. This pulley is adapted to slide on the shaft K, which is suitably mounted in bearings on the frame-work of the machine and lies parallel and over the rack H and centrally between the disks E and E'. As these disks revolve in opposite directions, the direction of the revolution of the pulley I is determined by its position between the disks E and E'. When it is moved toward the front edges of these wheels, it moves in one direction, and when it is moved to the opposite edges it has movement in the other direction; but, as above remarked about the pulley F, the pulley I may, when occasion requires, be so placed in the concave space between the disks E and E', formed by the central concavities $e$ and $e'$, respectively, in each, that the pulley shall not touch either, and thus be stationary. At the outer end of the shaft K is a bevel-gear $k$, meshing with a like gear on the shaft L, which shaft directly or indirectly moves the log-carriage.

At the outer ends of the short shafts D and $D^3$ are springs $d$, which will allow some horizontal movement of the shafts, but in their normal condition keep them in such position that they shall be arranged about the center of the casing. The tension of each spring is regulated by a screw $d'$.

The relative size of the disks B and B', as compared with the disks E and E', may be regulated at pleasure. Usually it may be preferred to make the saw-shaft disks the smaller.

The lever G moves in the slot $m$ in the top of the frame M, suitably secured to the frame of the machine, the lever-handle exposed to easy reach. By the circular slot $g^7$ in the mid-length of the lever and pin $m'$ in the top of standard $m^2$ on the frame in said slot the movement of the lever-handle will be steadied. By means of stops $m^3$, adapted to engage apertures in the upper part of the frame M, the operator is prevented from pushing or pulling the lever G past a certain point to avoid shifting the wheel I beyond or out of engagement with the disks E E'. Even though the machinery sticks and the wheel F continues to rotate, yet the stops will prevent the further movement horizontally of wheel I, the operator by a simple movement properly placing the wheel F with relation to the disks B B', and the lever G being held at its point of adjustment without assistance or stops for that purpose.

The lever G is pivoted at its lower end to the end of the rod $g^3$, which at its opposite end is jointed to the rod $g^4$. This rod is in turn pivoted at one end to the bar $g^5$, fixed to the frame of the device, and at its opposite end connected with the end of the rack-bar H by means of a screw-headed stud $g^\times$ and the slot $g^6$, and serves to steady as well as indicate its movements.

By moving the lever G to the left the pulley F is caused to impinge on the saw-shaft disk B', and the pulley I is consequently moved toward the front edges of the disks E and E'. If the continuous movement of the saw-log carriage is desired in the direction of the revolution of the shaft L as now made, the pulley F is thrown centrally between the disks B and B' and out of contact with either, and consequently the position of the pulley I is left unchanged. When the log-carriage is to be stopped, the pulley I is caused to be moved centrally between the disks E and E' by means of lever G and pulley F, &c., and when a movement reverse to the first above-described movement is desired the pulley F is brought into contact with the disk B and the pulley I moved to the opposite position between the disks E and E'. Of course it will be understood that the speed of the movement of the log-carriage is regulated by the position of the pulley I between the disks E and E'. This speed of the movement of the shaft that carries the log-carriage is determined by the position of the pulley I relative to the center or circumference of the disks E and E'. If this pulley is near the outer edge, its movement will be faster than when it is nearer the center of the disks. Thus any desired rate of speed for the movement of the log-carriage can be easily obtained. The position of the lever G also serves as an index of the position of the pulley I between the disks E and E', so that the speed of movement or the desired direction of the movement of the log-carriage can be determined at a glance or whether the said carriage is at rest. Thus when the lever G is moved toward the saw-shaft the said pulley will, as shown in these drawings, be on the left-hand side of the disks E E'. When at the center, the pulley will be between the central concavities in the faces of the said disks and at rest. When the lever is at the right-hand side of the frame M, the pulley I will be between the disks E E' on the side opposite the saw-shaft—that is, the right-hand side.

In Fig. 6 there is shown a modification of this mechanism; but the principle is the same as above described. In this figure a third disk $E^2$ is placed on the shaft D at a proper distance from the disk E, and in that case by merely reversing the position of pulley F and its connections, so that said pulley shall come between disks E and $E^2$, the same results as above described by the use of the disks B B' can be obtained.

It may here be remarked that the position of the connecting-rods $g'$ and $g^3$, as well as the mere location or mechanical means of the connections, may be as now shown or altered to suit any desired change in the mere form or adaptation of the several parts in relation to one another.

The operation of this device is as follows: Suppose that the log-carriage is at rest, with the wheel I motionless centrally in the concavities between the disks E and E'. If movement of the shafts K and L is desired, the lever G is so operated in connection with the rod $g^2$, &c., as to communicate motion to the friction-wheel F by causing it to impinge upon either the disk B or B', according as forward or backward motion of the log-carriage is desired. When the proper movement of this carriage has been obtained by locating the wheel I between the disks E and E' at the desired point, then the wheel F is removed from contact with saw-shaft disk. When a reverse motion of the log-carriage is desired, it is obtained in like manner as above, but by putting the wheel F against the other disk on the saw-shaft. By the same mechanism the log-carriage will be stopped by locating the wheel I centrally between the two disks E and E'.

Having now described my invention, I claim—

1. In a saw-mill feed, the combination of two disks fixed on the saw-shaft at a little distance apart, with two opposite disks respectively fixed on the end of opposite and shorter shafts in alignment with each other, said disks being at a little distance apart, the saw-shaft disks and one of the other disks having the same motion, the remaining disk having opposite motion, and friction-wheels respectively between the saw-shaft disks and the other disks, and mechanism adapted to enable the friction-wheel between the saw-shaft disks to effect the shifting or sliding of the friction-wheel between the opposite disks and to transmit movement from the latter friction-wheel to the log-carriage, whereby the movements of the log-carriage can be regulated at will.

2. In combination with two disks on the saw-shaft, a friction-wheel between said disks and movable by a lever and suitable connections, substantially as shown, a rack-bar movable by same wheel, and a friction-wheel operated by disks on the ends of short shafts opposite and parallel to the saw-shaft, said wheel being connected to said rack by a forked end or clutch, and a shaft conveying motion to the log-carriage, all substantially as set forth.

3. The combination of the lever G, rods $g^2$ and $g'$, and bell-crank $g$, the friction-wheels F and I, and the shifting or sliding guide or bearing for the wheel F, the rod $g^3$, having connection with the pivoted arm or lever $g^4$, the sliding rack-bar having slot-and-stud connection with said arm or lever, and the saw-shaft disks, between which is arranged wheel F, and means adapted to enable the engagement of said wheel F with either of the saw-shaft disks to cause said rack to shift the wheel I along the surfaces of oppositely-rotatable disks for actuating the log-carriage, substantially as set forth.

4. In a saw-mill feed, the combination of the disks B B', the friction-wheel I, and the shaft F', having at one end the friction-wheel F arranged to have engagement with either of the disks B B' and having at its opposite end the worm-gear $f''$, with the rack-bar H, supported in a guide-frame, the bracket $h$, supporting the end of the shaft, having the worm-gear $f'$ and pivoted to said guide-frame, and the shaft supported in said guide-frame and carrying the gear-wheel $h^2$, geared to said worm-gear, and the pinion $h^3$, engaging said rack, and means adapted to enable said rack to shift the friction-wheel I along the surfaces of the oppositely-rotatable disks, substantially as set forth.

5. In a saw-mill feed, the combination of the following elements: the friction-wheel having its shaft provided with a worm-gear, the saw shaft or mandrel having fixed thereto two disks, the oppositely-rotatable disks, the rack adapted to be moved by said worm-gear, and a gear-wheel and pinion intergearing with said worm-gear and rack, and a sliding friction-wheel adapted to rotate and to be moved back and forth by said rack between and to engage the oppositely-rotatable disks and to actuate through its shaft the mechanism operating the log-carriage, substantially as set forth.

6. In a saw-mill feed, the combination of the oppositely-rotatable disks, the saw mandrel or shaft having fixed thereto two disks, the sliding rack, the sliding friction-wheel, and the shaft having at one end a friction-wheel engaging either of the disks of the saw mandrel or shaft and having at its opposite end a worm adapted by intermediate gearing to actuate said rack adapted to move back and forth said sliding friction-wheel between said oppositely-rotatable disks, the latter having central concavities and engaged by said sliding wheel, and the hand-lever and its means of connection with the support for one end of the shaft carrying the friction-wheel engaging the saw-mandrel disks, said lever being arranged parallel with said disks, substantially as set forth.

7. In a saw-mill feed, the combination of the saw-mandrel disks, the sliding friction-wheel I, the sliding rack having a fork $h^4$, the friction-wheel F, adapted to be shifted into engagement with either of said disks and having its shaft provided with a worm-gear adapted to actuate by intermediate gearing said sliding rack, and the oppositely-rotatable disks having the central or axial concavities, said fork engaging a peripheral groove in an extension of said sliding friction-wheel, substantially as set forth.

In testimony whereof I affix my signature in presence of two witnesses.

FRANK. B. WILLIAMS.

Witnesses:
WM. PENROSE,
E. R. MCMEEN.